(12) United States Patent
Medeiros et al.

(10) Patent No.: US 12,288,077 B2
(45) Date of Patent: Apr. 29, 2025

(54) MULTI-BOOT ARCHITECTURE FOR ELECTRONIC INTERACTION DEVICE

(71) Applicant: Capital One Services, LLC, McLean, VA (US)

(72) Inventors: Alexander Medeiros, Arlington, VA (US); Mitchell Miller, Tysons, VA (US); Rex Lacy, Sterling, VA (US); Michael Littlejohn, Fairfax, VA (US); David Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/209,737

(22) Filed: Mar. 23, 2021

(65) Prior Publication Data
US 2022/0308891 A1 Sep. 29, 2022

(51) Int. Cl.
*G06F 9/4401* (2018.01)
*G06F 21/57* (2013.01)
*G06F 21/60* (2013.01)
*H04L 9/40* (2022.01)

(52) U.S. Cl.
CPC ............ *G06F 9/441* (2013.01); *G06F 9/4408* (2013.01); *G06F 9/4416* (2013.01); *G06F 21/572* (2013.01); *G06F 21/602* (2013.01); *H04L 63/04* (2013.01)

(58) Field of Classification Search
CPC ...... G06F 9/441; G06F 9/4408; G06F 9/4416; G06F 21/572; G06F 21/602; H04L 63/04
See application file for complete search history.

(56) References Cited

U.S. PATENT DOCUMENTS

| | | | |
|---|---|---|---|
| 7,121,460 B1 | 10/2006 | Parsons et al. | |
| 8,924,952 B1 * | 12/2014 | Hou | G06F 8/65 717/172 |
| 9,117,328 B2 | 8/2015 | Crews et al. | |
| 2001/0025371 A1 * | 9/2001 | Sato | G06F 11/3068 714/E11.167 |
| 2004/0172578 A1 * | 9/2004 | Chen | G06F 11/1417 714/E11.133 |
| 2008/0282084 A1 * | 11/2008 | Hatakeyama | G06F 21/57 713/168 |

(Continued)

FOREIGN PATENT DOCUMENTS

| | | | | |
|---|---|---|---|---|
| KR | 10-2013-0075807 A | 7/2013 | | |
| KR | 20130075807 A | * 7/2013 | ............. | G07F 19/20 |

*Primary Examiner* — Hyun Soo Kim
(74) *Attorney, Agent, or Firm* — Bookoff McAndrews, PLLC

(57) ABSTRACT

An electronic interaction device may include: a user interface configured to receive interaction requests by a user; a first data storage medium storing a first operating system; a second data storage medium storing a second operating system; a memory storing instructions; and a control unit including a processor. The control unit may be configured to: load the first operating system in response to the electronic interaction device being powered on; communicate with a remote server via a secure communications channel; transmit a status of the first operating system to the remote server via the secure communications channel; receive a boot instruction from the remote server via the secure communications channel; and in response to the boot instruction, load the second operating system.

20 Claims, 5 Drawing Sheets

(56) References Cited

U.S. PATENT DOCUMENTS

| | | | |
|---|---|---|---|
| 2011/0083004 A1* | 4/2011 | Lipinski | G06F 11/0748 714/E11.021 |
| 2011/0087920 A1* | 4/2011 | Hendricks | H04L 9/3247 714/21 |
| 2014/0310510 A1* | 10/2014 | Potlapally | G06F 9/4406 714/19 |
| 2015/0149412 A1* | 5/2015 | Kobres | G06F 9/4416 703/2 |
| 2021/0011737 A1* | 1/2021 | Yu | H04W 12/35 |

\* cited by examiner

MULTI-BOOT ARCHITECTURE FOR ELECTRONIC INTERACTION DEVICE

TECHNICAL FIELD

Various embodiments of the present disclosure relate generally to an electronic interaction device having multiple operating systems, and more specifically to systems and methods for loading multiple operating systems on an electronic interaction device.

BACKGROUND

Electronic kiosks such as parking ticket payment machines, automated teller machines, and self-checkout kiosks generally utilize software and software operating systems to provide services to users or customers. Electronic kiosks may, in some circumstances, provide an interactive user interface with selectable icons or buttons that cause different windows and menus to be displayed.

If an operating system of an electronic kiosk malfunctions, the electronic kiosk may become inoperable. An operating system may malfunction due to a hardware failure of a storage medium storing the operating system. An operating system may likewise malfunction due to bugs in a software update or a virus. Regardless of the reason for the malfunction, a malfunctioning operating system may render an electronic kiosk unusable by users or customers, thereby costing a custodian of the electronic kiosk business or good will.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for loading multiple operating systems on an electronic interaction device are described.

In one example, an embodiment of an electronic interaction device may include: a user interface configured to receive interaction requests by a user; a first data storage medium storing a first operating system; a second data storage medium storing a second operating system; a memory storing instructions; and a control unit including a processor, wherein the control unit may be operatively connected to the memory and configured to execute the instructions to carry out a plurality of operations. The plurality of operations may include: loading the first operating system in response to the electronic interaction device being powered on; communicating with a remote server via a secure communications channel; transmitting a status of the first operating system to the remote server via the secure communications channel; receiving a boot instruction from the remote server via the secure communications channel; and in response to the boot instruction, loading the second operating system.

In another example, an embodiment of a computer-implemented method for managing an electronic interaction device may include: loading, by the electronic interaction device, a first operating system stored on a first data storage medium; determining, by the electronic interaction device, a status of the first operating system; transmitting, by the electronic interaction device, the status of the first operating system to a remote server via a secure communications channel; receiving, by the electronic interaction device, a boot instruction from the remote server via the secure communications channel; and in response to the boot instruction, loading, by the electronic interaction device, a second operating system stored on a second data storage medium.

In yet another example, an embodiment of a system may include: a remote server configured to communicate via a secure network; and an electronic interaction device configured to communicate via the secure network. The electronic interaction device may include: a user interface configured to receive interaction requests by a user; a first hard disk drive storing a first operating system; a second hard disk drive storing a second operating system; a memory storing instructions; and a primary processor operatively connected to the memory. The primary processor may be configured to execute the instructions to: load the first operating system; load the second operating system; communicate with a remote server via a secure communications channel; in response to an interaction request received via the user interface, perform an interaction, wherein performing the interaction may involve exchanging interaction data with the remote server via the secure communications channel; transmit a status of the first operating system to the remote server via the secure communications channel. The electronic interaction device may further include a secondary processor configured to: receive a boot instruction from the remote server via the secure communications channel; and in response to the boot instruction, cause the second operating system to be loaded.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
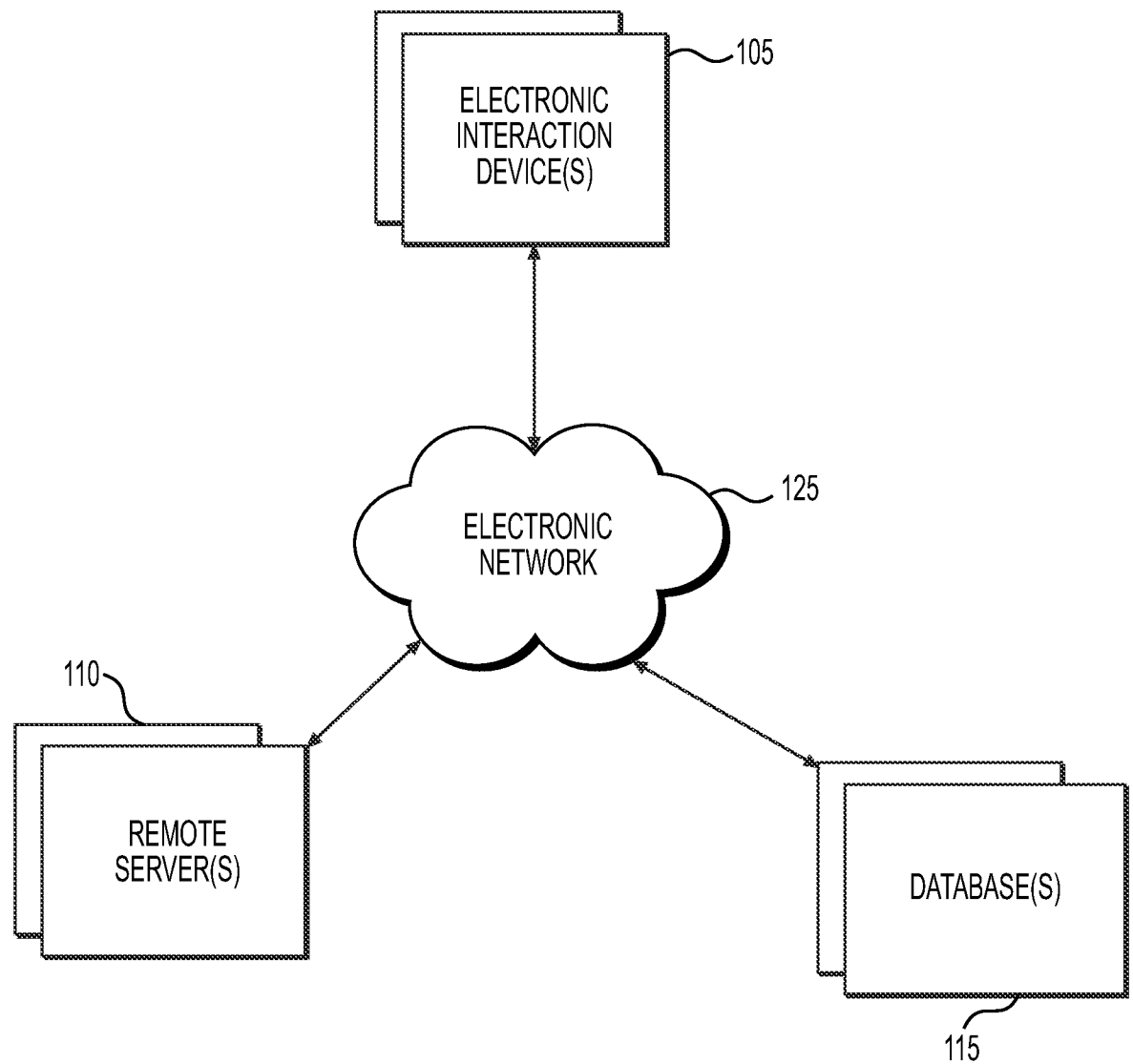
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "electronic interaction device" or the like generally encompasses a computer device with which a user may interact and which may include: electronic kiosks, ticketing machines, payment machines, automated teller machines (ATMs), information kiosks, self-checkout machines, computerized vending machines, identification verification machines, electronic parcel retrieval lockers, an automated merchant device, and the like.

In general, the present disclosure provides electronic interaction devices having multiple operating systems stored thereon, and more specifically to systems and methods for loading operating systems on an electronic interaction device. As will be discussed hereinafter in more detail, the methods and systems according to the present disclosure offer significant technical improvements.

Electronic interaction devices have become ubiquitous in recent years, providing users with greatly improved access to products and services. For example, a parking ticket payment machine may allow a user wishing to park a vehicle to pay for parking even when a parking attendant is not available. As another example, an ATM may allow a user access to banking resources, such as cash withdrawal or check depositing services, outside of normal banking hours. As a further example, self-checkout machines in grocery stores offer additional capacity for checking out customers without the need to hire additional staff. In general, electronic interaction devices offer conveniences users have to come to expect and on which they rely.

Electronic interaction devices are very often computerized, and may require software to operate. An electronic interaction device may, for example, include an operating system which manages the various hardware elements, software elements, and user interface elements of the electronic interaction device. The operating system may be stored locally on the electronic interaction device on a physical storage medium such as a hard disk drive, solid state drive, RAM, ROM, or the like. Each time an electronic interaction device is powered on or otherwise initialized, the operating system may be loaded from the storage medium.

An electronic interaction device may depend on various hardware elements and software elements to operate such that a failure of any one or more of the hardware and software elements may cause the electronic interaction device to become inoperable. In particular, a failure of the operating system or the storage medium on which it is stored may be likely to cause the electronic interaction device to become inoperable. The operating system itself may fail in any number of ways. For example, the operating system may become corrupted by malware or even through ordinary use. As another example, a buggy or flawed update file may be applied to the operating system. For any number of reasons the update may not work properly and may cause the operating system to fail. Additionally, the storage medium may fail, for example, due to cyclic failure or any other type of physical damage.

Failure of either the operating system or the storage medium may cause the electronic interaction device to become inoperable and therefore unavailable to users for an extended period of time. When such a failure occurs, the services provided by the electronic interaction device may also be unavailable. For example, an ATM that has experienced such a failure may not allow banking customers to access cash or deposit checks while the ATM is malfunctioning. As another example, a parking ticket payment machine that has experienced such a failure may not allow a parking patron to submit payment and, in some instances, may prohibit the parking patron from exiting a parking complex. As another example, a self-checkout machine that has experienced such a failure may not allow store customers to check out merchandise, thereby forcing them to other aisles and potentially causing delays within a store. Each of these situations may cause aggravation to a user of the electronic interaction device and may cost a custodian of the electronic interaction device business and goodwill.

Existing methods for restoring an electronic interaction device that has experienced such a failure to a functioning state are costly and time consuming. A custodian of an electronic interaction device may have to dispatch a technician to the electronic interaction device to install a functioning operating system or to manually replace a failed hard drive. While the technician is working, the electronic interaction device may remain out of service for hours or even days. Moreover, in the case of an electronic interaction device with access to valuable resources, such as an ATM, having a technician work at the physical premises of the electronic interaction device may subject the technician, the electronic interaction device, or the valuable resources to attack by opportunistic criminals. Consequently, a custodian of the electronic interaction device may be required to purchase expensive liability insurance.

Accordingly, a need exists to address the foregoing challenges. Particularly, a need exists to mitigate the impact of operating system failure and storage medium failure in electronic interaction devices. Embodiments of the present disclosure offer technical solutions to address the foregoing needs, as well as other needs.

FIG. 1 depicts an exemplary computing environment 100 that may be utilized with techniques presented herein. One or more electronic interaction device(s) 105 and one or more remote server(s) 110 may communicate across an electronic network 125. One or more database(s) 115 may communicate with one or more of the other components of the computing environment 100. The systems and devices of the computing environment 100 may communicate in any arrangement. As will be discussed herein, systems and/or devices of the computing environment 100 may communicate in order to load operating systems on the electronic interaction device 105.

The electronic interaction device 105 may be a computer system such as any of the examples described herein previously. In an exemplary embodiment, the electronic interaction device 105 may be a parking ticket payment machine or the like. Alternatively, the electronic interaction device 105 may be an ATM or a self-checkout device. In some embodiments, the electronic interaction device 105 may include one or more electronic application(s), e.g., a program, plugin, etc., installed on a memory of the electronic interaction device 105. In some embodiments, the electronic application(s) may be associated with one or more of the other components in the computing environment 100. The electronic interaction device 105 may further include a display and a user interface which may be a graphical user interface (GUI).

The database 115 may include data collected or generated by the electronic interaction device 105 or the remote server 110. The electronic interaction device 105 may collect user data associated with a user of the electronic interaction device 105. In the case of a parking ticket payment machine, the user data may include payment information, vehicle information, or the like. In the case of an ATM, the user data may include account information, transaction information, or the like. In the case of a self-checkout machine, the user data may include payment information, merchandise information, or the like. The electronic interaction device 105 may collect the user data that is manually entered by the user, from any of various sensors included in the electronic interaction device 105, or from remote server 110.

In various embodiments, the electronic network 125 may be a wide area network ("WAN"), a local area network ("LAN"), personal area network ("PAN"), or the like. In some embodiments, electronic network 125 is a secured network. In some embodiments, the secured network may be protected by any of various encryption techniques. In some embodiments, the secured network may be a closed network lacking external connectivity. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, a portion of the database 115 may be provided to the electronic interaction device 105 as an electronic portal via an electronic application. At least a portion of remote server 110 may be integrated into the database 115, the electronic interaction device 105, or another system. Any suitable arrangement of the various systems and devices of the computing environment 100 may be used.

In the methods below, various acts are described as performed or executed by a component from FIG. 1, such as electronic interaction device 105 or remote server 110. However, it should be understood that in various embodiments, various components or combinations of components of the computing environment 100 discussed above may execute instructions or perform acts including the acts discussed below. Further, it should be understood that in various embodiments, various steps may be added, omitted, and/or rearranged in any suitable manner.

Figure 2:
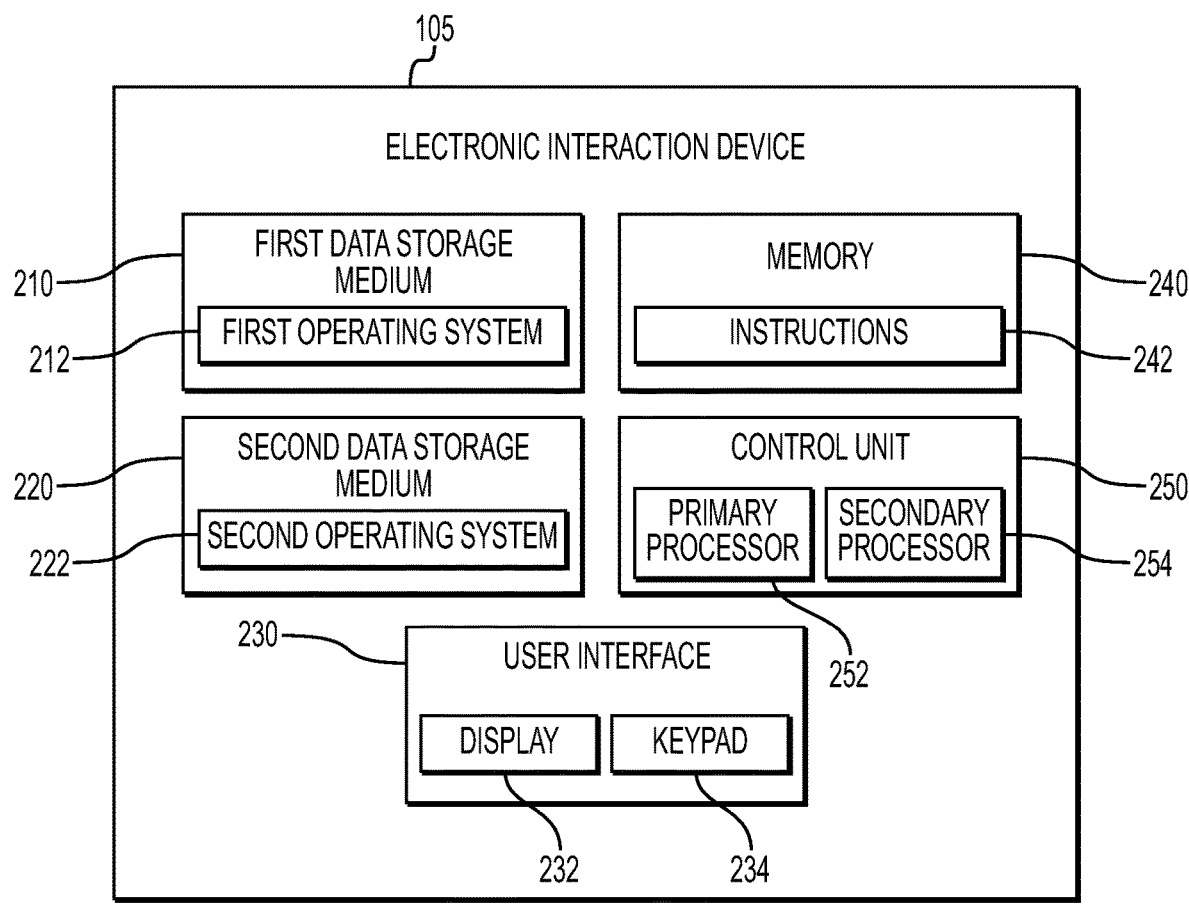
FIG. 2 depicts a functional block diagram of an electronic interaction device, according to one or more embodiments.

FIG. 2 illustrates a functional block diagram of an electronic interaction device 105, according to one or more embodiments. It is to be understood that the electronic interaction device 105 may include fewer than all components shown in FIG. 2 and may also include additional components not shown in FIG. 2.

As shown in FIG. 2, electronic interaction device 105 may include a first data storage medium 210. The first data storage medium 210 may be any of a hard disk drive, a partition of a hard disk drive, a solid state drive, a partition of a solid state drive, RAM, ROM, any combination of the foregoing, or any other storage medium configured to store software or data. The first data storage medium 210 may be encrypted such that it must be decrypted upon booting of the electronic interaction device 105 for access to any of the files stored thereon. The first data storage medium 210 may include a first operating system 212 stored thereon. The electronic interaction device 105 may be configured to load the first operating system 212 on booting. The first operating system 212 may be a Windows operating system, a Macintosh operating system, a Linux operating system, a Unix operating system, an Android operating system, or any other type of operating system. The first operating system 212 may be configured to manage various other components of the electronic interaction device 105 described herein. The first operating system 212 may be further configured to manage any additional software loaded on the electronic interaction device 105, including applications or programs. The first operating system 212 may be encrypted such that it must be decrypted upon booting of the electronic interaction device 105 to be loaded.

Electronic interaction device 105 may further include a second data storage medium 220. Like the first data storage medium 210, the second data storage medium 220 may be any of a hard disk drive, a hard disk drive distinct from the first data storage medium 210, a partition of a hard disk drive, a solid state drive, a solid state drive distinct from the first data storage medium 210, a partition of a solid state drive, RAM, ROM, any combination of the foregoing, or any other storage medium configured to store software. The second data storage medium 220 may be encrypted such that it must be decrypted upon booting of the electronic interaction device 105 for access to any of the files stored thereon. The second data storage medium 220 may include a second operating system 222 stored thereon. The electronic interaction device 105 may be configured to load the second operating system 222 on booting. The second operating system 222 may be a Windows operating system, a Macintosh operating system, a Linux operating system, a Unix operating system, an Android operating system, or any other type of operating system. The second operating system 222 may be configured to manage various other components of the electronic interaction device 105 described herein. The second operating system 222 may be further configured to manage any additional software loaded on the electronic interaction device 105, including applications or programs. The second operating system 222 may be encrypted such that it must be decrypted upon booting of the electronic interaction device 105 to be loaded.

The electronic interaction device 105 may further include a user interface 230. The user interface 230 may include a display 232, which may be an LCD, LED, CRT, or any other type of display. The user interface 230 may also include a keypad 234. The keypad 234 may be an alphanumeric keypad, a numeric keypad, or any other type of keypad configured to receive selections by a user. Alternatively, the display 232 and the keypad 234 may be integrated in a touch screen configuration via which a user may input selections to the electronic interaction device 105 by directly touching the display 232. When the electronic interaction device 105 is powered on and boots to one of the first operating system 212 or second operating system 222, a graphical user interface may be depicted on the display 232 via which a user may operate the electronic interaction device 105. A user may use the graphical user interface to submit various interaction requests to the electronic interaction device 105. Such interaction requests may include, for example, requests to pay parking fees, requests for ATM transactions, requests to pay for merchandise, and other requests. In response to an interaction request, performing the interaction may involve, for example, exchanging interaction data with the remote server 110 and/or the database 115. The interaction data may be exchanged via the secure communications channel.

The electronic interaction device 105 may further include a memory 240. The memory 240 may be a RAM or any other suitable storage device, where the memory 240 stores instructions 242. The electronic interaction device 105 may further include a control unit 250. The control unit 250 may comprise a primary processor 252 and a secondary processor 254. The primary processor 252 may be a central processing unit (CPU) for the electronic interaction device 105 and may be operatively connected to the memory 240. The primary processor 252 may be further configured to execute the instructions 242.

In some embodiments, the secondary processor 254 may include a secure cryptoprocessor, such as a Trusted Platform Module (TPM) processor. The secure cryptoprocessor may include one or more secret keys burned into it during production, or otherwise integrated into the hardware of the secure cryptoprocessor. The secure cryptoprocessor may be used to authenticate hardware components of the electronic interaction device 105, such as the first data storage medium 210 or the second data storage medium 220. For example, the one or more secret keys of the secure cryptoprocessor may be used to encrypt the first data storage medium 210 and/or second data storage medium 220. The secret keys may be further used to decrypt the first data storage medium 210 and/or second data storage medium 220 upon booting of the electronic interaction device 105.

The secure cryptoprocessor may further serve to form a "root of trust" in the electronic interaction device 105. In other words, the secure cryptoprocessor may serve to confirm that the electronic interaction device 105 is using specified software and/or hardware components. For example, the secure cryptoprocessor may store security-relevant metrics relating to the software and/or hardware components of the electronic interaction device 105 corresponding to a given point in time. The security-relevant metrics may indicate a precise configuration of software and/or hardware components of the electronic interaction device 105 at the given point in time. The secure cryptoprocessor may then, at subsequent points in time, verify the security-relevant metrics to ensure that the configuration of software and/or hardware components has not changed. For example, the secure cryptoprocessor may verify the security-relevant metrics to ensure that no change has been made to the first data storage medium 210 and/or the second data storage medium 220, such as replacement by a different device. The secure cryptoprocessor may then transmit an attestation or verification that, based on the security-relevant metrics, no change to the configuration has been made to the configuration of software and/or hardware components of the electronic interaction device 105 since the given point in time. The secure cryptoprocessor may transmit the verification to, for example, the remote server 110.

As another example of how the secure cryptoprocessor may form the root of trust, the secure cryptoprocessor may generate a hash key corresponding to a configuration of software and/or hardware components of the electronic interaction device 105. The hash key may act as a summary of the configuration. The hash key may be transmitted to the remote server 110, for example, which may verify the hash key and, by extension, the configuration.

Alternatively, or in addition, the secondary processor 254 may comprise a service processor with hardware-based management and/or out-of-band management capabilities. The service processor may, for example, be configured with Intel Active Management Technology (AMT) capabilities. As such, the service processor may be able to communicate with a remote device, such as remote server 110. The service processor may also be inaccessible to a user of the electronic interaction device 105, and may receive instructions exclusively from the remote server 110. The service processor may be configured to power on or power off electronic interaction device 105, power cycle electronic interaction device 105, or boot an operating system, such as first operating system 212 or second operating system 222. The service processor may be configured to perform such actions upon receiving corresponding instructions from the remote server 110.

Figure 3:
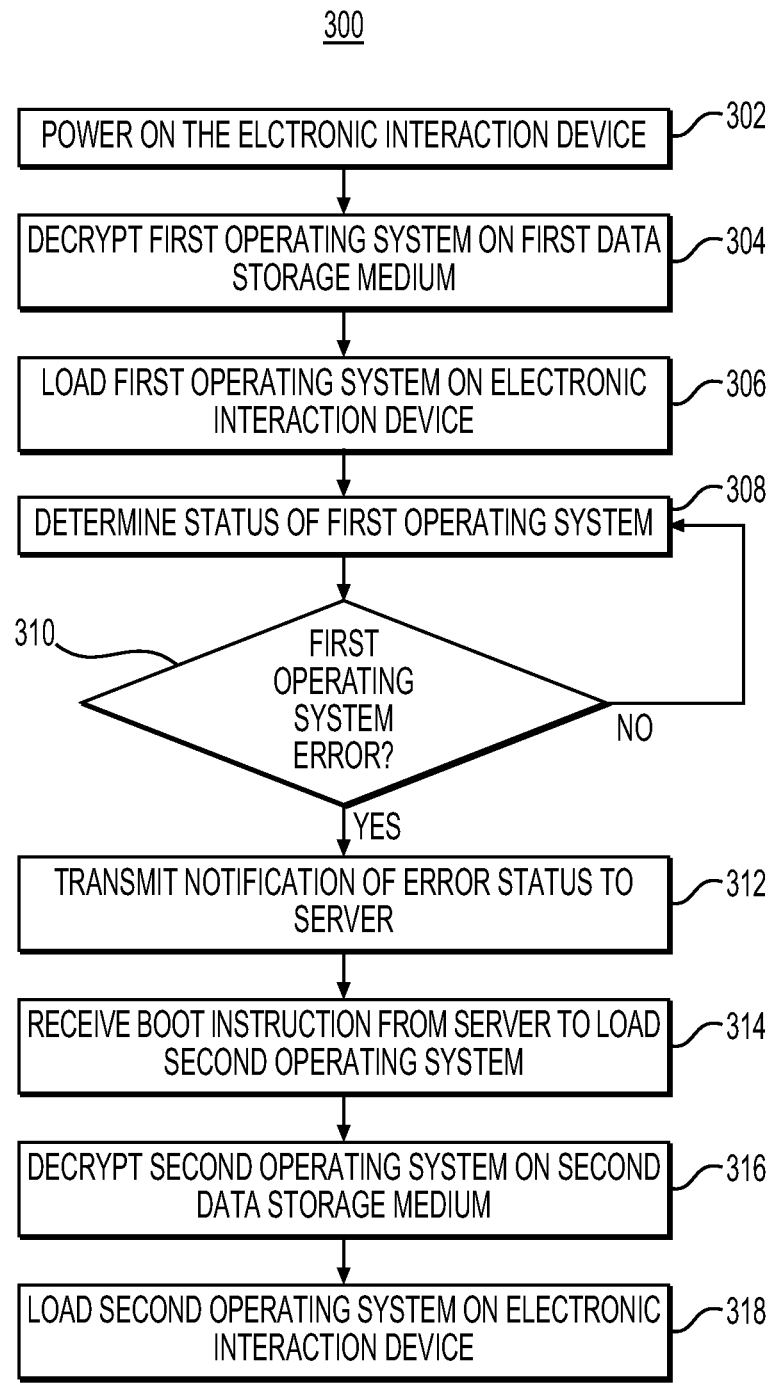
FIG. 3 depicts a flowchart of an exemplary method of loading operating systems on an electronic interaction device, according to one or more embodiments.

FIG. 3 illustrates an exemplary process 300 for loading operating systems on an electronic interaction device 105 which may use components described herein previously with respect to FIG. 2. The process 300 may be used, for example, to load a second operating system 222 when a first operating system 212 experiences a failure, thereby ensuring continued operation of the electronic interaction device 105. For example, at step 302 electronic interaction device 105 may be powered on. Electronic interaction device 105 may be powered in response to a signal transmitted by remote server 110 and received by secondary processor 254, or alternatively may be powered on manually. Upon powering on, the electronic interaction device 105 may be configured, or may otherwise receive an instruction, to load the first operating system 212. The first operating system 212 may be stored on the first data storage medium 210 in an encrypted state for security. For example, encryption of the first operating system 212 may help to prevent the first operating system 212 from being tampered with.

At step 304, the first operating system 212 may be decrypted. The first operating system 212 may be decrypted by the secondary processor 254, for example, using secret keys burned thereon. At step 306, once the first operating system 212 is decrypted, the first operating system 212 may be loaded on the electronic interaction device 105 by the primary processor 252. When the first operating system 212 is loaded, the electronic interaction device 105 may be operable for use by a user.

At step 308, the electronic interaction device 105 may determine a status of the first operating system 212. The status of the first operating system 212 may be determined by the primary processor 252 and/or the secondary processor 254. The status of the first operating system 212 may include an indication that the first operating system 212 is properly functioning or may include an indication that the first operating system 212 is experiencing an error. In a situation where the status of the first operating system 212 includes an indication that the first operating system 212 is experiencing an error, the error may render the electronic interaction device 105 inoperable.

At step 310, if the first operating system 212 is not experiencing an error, the process 300 may revert to step 308 to continue monitoring the status of the first operating system 212. If, on the other hand, the first operating system 212 is experiencing an error, the process 300 may proceed to step 312. At step 312, a notification of the error, or an alert, may be transmitted to remote server 110. The notification of the error may be transmitted by, for example, the primary processor 252 or the secondary processor 254. The remote server 110 may be configured to display the notification of the error to a technician monitoring the electronic interaction device 105 or the remote server 110 may be configured to process the notification of the error itself. In response to the notification of the error, the remote server 110 may transmit a boot instruction to the electronic interaction device 105 to load the second operating system 222 in lieu of the malfunctioning first operating system 212 in order to return the electronic interaction device 105 to an operational state.

While the step 312 has been described herein as a transmission of the notification of the error to the remote server 110, it should be understood that the electronic interaction device 105 may also transmit a notification or indication that the electronic interaction device 105 is not experiencing an error or is otherwise operating properly to the remote server 110 for monitoring purposes.

At step 314, the electronic interaction device 105 may receive the instruction to load the second operating system 222. The instruction may be received and processed by the secondary processor 254 via a secure communications channel. At step 316, the second operating system 222 may be decrypted. The second operating system 222 may be decrypted by the secondary processor 254, for example, using secret keys burned thereon. At step 318, once the second operating system 222 is decrypted, it may be loaded on the electronic interaction device 105 by the primary processor 252. When second operating system 222 is loaded, the electronic interaction device 105 may become operable again for use by a user.

Process 300 may therefore allow an operating status of the first operating system 212 loaded on the electronic interaction device 105 to be remotely monitored for errors using the remote server 110. Should the first operating system 212 experience an error that may render the electronic interaction device 105 inoperable by a user, the remote server 110 may be able to quickly return the electronic interaction device 105 to an operable state by instructing the electronic interaction device 105 to load the second operating system 222 instead. Assuming the second operating system 222 is not also experiencing an error, loading the second operating system 222 may allow the electronic interaction device 105 to be placed back into an operable state quickly and without the need for a technician to physically visit the electronic interaction device 105 to manually load an error-free operating system.

It is to be understood that process 300 need not necessarily be performed in the exact order described herein and the steps described herein may be rearranged in some embodiments. Further, in some embodiments fewer than all steps of process 300 may be performed and in some embodiments additional steps may be performed.

Figure 4:
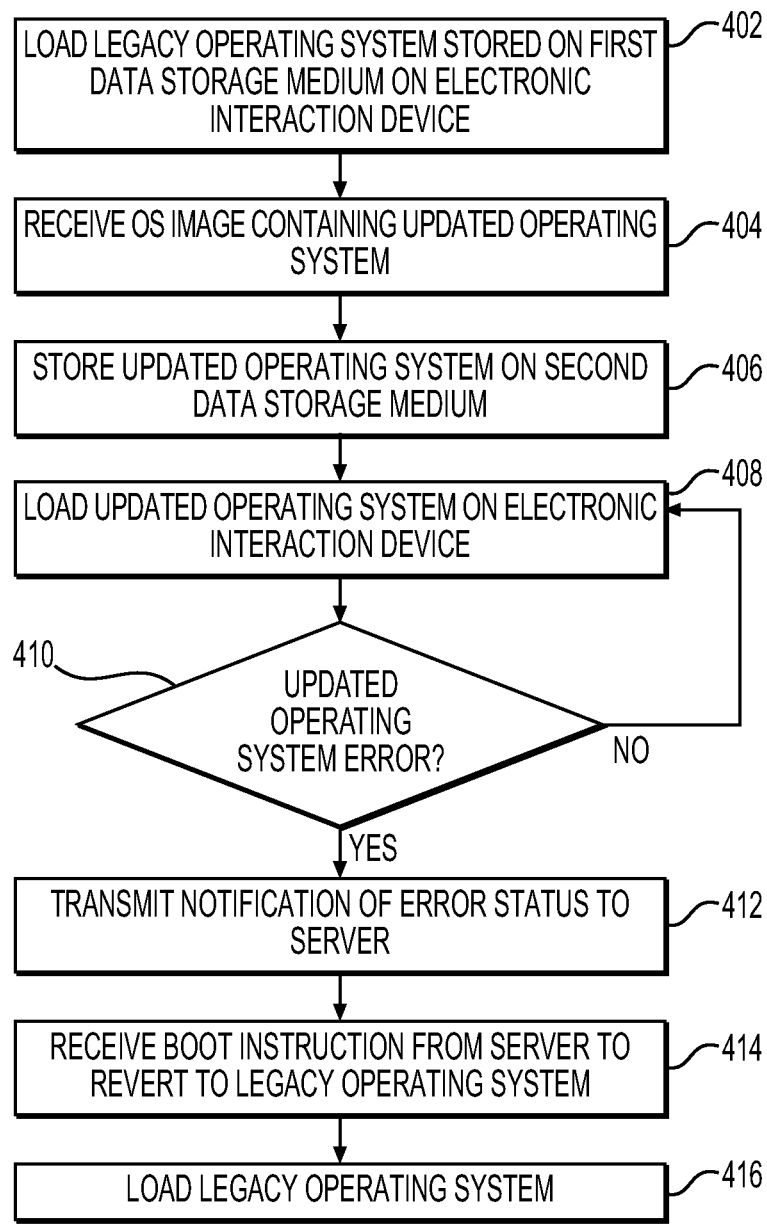
FIG. 4 depicts a flowchart of an exemplary method of loading an operating system on an electronic interaction device, according to one or more embodiments.

FIG. 4 depicts an exemplary process 400 for remotely installing and loading an updated operating system on an electronic interaction device 105 which may use components described herein previously with respect to FIG. 2. The process 400 may be used, for example, to transition from operating the electronic interaction device 105 using the legacy operating system to operating the electronic interaction device 105 using the updated operating system. Such a transition may occur for any number of reasons, such as due to scheduled maintenance, revised regulatory requirements, or obsolescence of the legacy operating system.

Process 400 may begin, for example, at step 402 where the legacy operating system may be loaded on the electronic interaction device 105. The legacy operating system may be loaded upon powering on of the electronic interaction device 105. The legacy operating system may further be stored on the first data storage medium 210. Similar to the operating systems described herein previously with respect to process 300, the legacy operating system may be stored on the first data storage medium 210 in an encrypted state for security. Such encryption may help to prevent the legacy operating system from being tampered with. If the legacy operating system is stored in an encrypted state, it may be decrypted by the secondary processor 254, for example, prior to being loaded. Upon the legacy operating system being loaded, the electronic interaction device 105 may become operable by a user.

At step 404, the electronic interaction device 105 may receive an operating system image containing an updated operating system. The operating system image may be transmitted by the remote server 110. The operating system image may be received by the primary processor 252. At step 406, the primary processor 252 may store the updated operating system within the operating system image on the second data storage medium 220. If an operating system was already stored on the second data storage medium 220 when the updated operating system is received, the primary processor 252 may overwrite the content of the second data storage medium 220 with the update operating system. Alternatively, the primary processor 252 may store the operating system image itself on the second data storage medium 220 such that the updated operating system is bootable. The updated operating system may be stored on the second data storage medium 220 in an encrypted state for security.

At step 408, the updated operating system may be loaded on the electronic interaction device 105 by the primary processor 252. If the updated operating system is stored in an encrypted state, the updated operating system may be decrypted prior to loading, for example, by the secondary processor 254. When the updated operating system is loaded, the electronic interaction device 105 may be operable for use by a user.

At step 410, the electronic interaction device 105 may determine a status of the updated operating system. The status of the updated operating system may be determined by the primary processor 252 and/or the secondary processor 254. The status of the updated operating system may include an indication that the updated operating system is properly functioning or may include an indication that the updated operating system is experiencing an error. If the status of the updated operating system includes an indication that it is experiencing an error, the electronic interaction device 105 may be in an inoperable state. If the updated operating system is not experiencing an error, the process 400 may revert to step 408 to continue monitoring the status of the updated operating system. If, on the other hand, the updated operating system is experiencing an error, the process 400 may proceed to step 412.

At step 412, a notification of the error may be transmitted to remote server 110. The notification of the error may be transmitted by, for example, the primary processor 252 or the secondary processor 254. The remote server 110 may be configured to display the notification of the error to a technician monitoring the electronic interaction device 105 or the remote server 110 may be configured to process the notification of the error itself. In response to the notification of the error, the remote server 110 may transmit a boot instruction to the electronic interaction device 105 to revert to the legacy operating system in lieu of the malfunctioning updated operating system in order to return the electronic interaction device 105 to an operational state.

While the step 412 has been described herein as a transmission of the notification of the error to the remote server 110, it should be understood that the electronic interaction device 105 may also transmit a notification or indication that the updated operating system is not experiencing an error, or is otherwise operating properly, to the remote server 110 for monitoring purposes.

At step 414, the electronic interaction device 105 may receive the instruction to revert to, and load, the legacy operating system. The instruction may be received and processed by the secondary processor 254 via a secure communications channel. At step 416, the legacy operating system may be loaded. If the legacy operating system is stored in an encrypted state, the legacy operating system may first be decrypted by the secondary processor 254, for example, prior to loading. When the legacy operating system is loaded, the electronic interaction device 105 may become operable again for use by a user.

It is to be understood that process 400 need not necessarily be performed in the order described herein and the steps described herein may be rearranged in some embodiments. Further, in some embodiments fewer than all steps of process 400 may be performed and in some embodiments additional steps may be performed.

Process 400 may therefore allow an updated operating system to be installed and loaded on the electronic interaction device 105 with minimal interruption to the operability of the electronic interaction device 105. Process 400 may further allow reversion to a legacy operating system should the updated operating system experience an error, with minimal interruption to the operability of the electronic interaction device 105. In an example use case, process 400 may be used when it is determined that a legacy operating system on the electronic interaction device 105 is due to be replaced with an updated operating system. The electronic interaction device 105 may remain in in an operable condition with the legacy operating system loaded on the first data storage medium 210 and running while the updated operating system is installed on the second data storage medium 220. The updated operating system may simply be a modified version of the legacy operating system. The electronic interaction device 105 may then boot to the updated operating system with minimal disruption to the operability of the electronic interaction device 105. If it is determined that the updated operating system is not working properly due to a bug, coding error, or any other type of issue, the electronic interaction device 105 may then revert to the legacy operating system, again with minimal interruption to the operability of the electronic interaction device 105.

Aspects of the embodiments described herein are several. For example, in the event of a failure of an operating system, or a disk drive on which it is stored, of an electronic interaction device 105, the need for a lengthy repair process may be obviated. Indeed, the electronic interaction device 105 may be remotely instructed to boot to a secondary operating system on a secondary disk drive to quickly restore operability of the electronic interaction device 105. The electronic interaction device 105 may also be quickly loaded with an updated operating system to provide a quick transition from a legacy operating system. In the event the updated operating system is faulty, the electronic interaction device 105 may be remotely reverted to the legacy operating system with minimal interruption to the operability of the electronic interaction device 105. Embodiments may further obviate the need for a technician to travel to the site of the electronic interaction device 105 where the technician may be in a precarious situation due to the contents of the electronic interaction device 105. Secure and remote loading of a functional operating system may instead be implemented to minimize interruption to operability. As a result, a custodian of an electronic interaction device 105 may increase customer satisfaction and good will for minimizing inoperability of the electronic interaction device 105.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 3 and 4, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
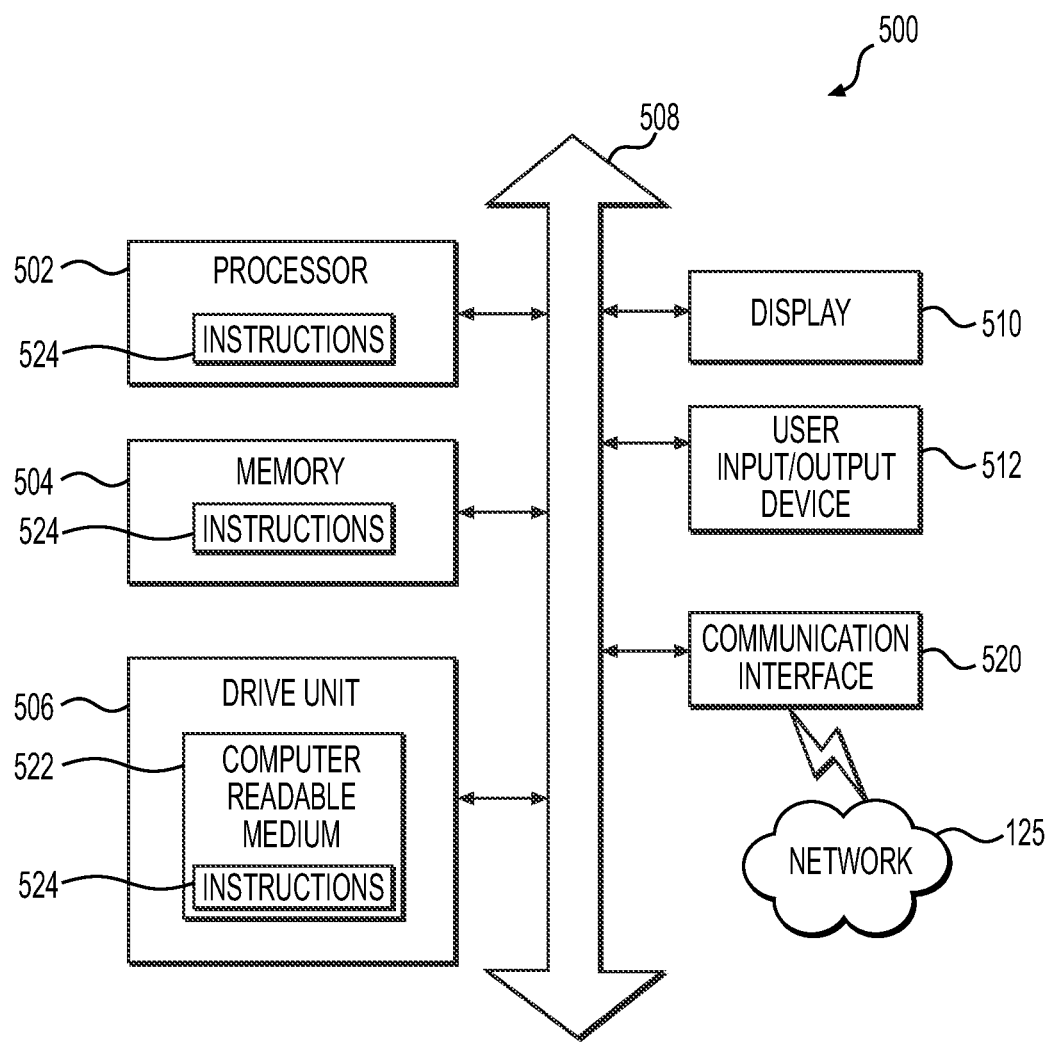
FIG. 5 depicts an example of a computing device, according to one or more embodiments.

FIG. 5 is a simplified functional block diagram of a computer system 500 that may be configured as a device for executing the processes of FIGS. 3 and 4, according to exemplary embodiments of the present disclosure. FIG. 5 is a simplified functional block diagram of a computer that may be configured to serve as any of the remote server 110 and the database 115, according to exemplary embodiments of the present disclosure. In some embodiments, the electronic interaction device may include the components of FIG. 5 in addition to the specific components described herein previously. In various embodiments, any of the systems herein may be an assembly of hardware including, for example, a data communication interface 520 for packet data communication. The platform also may include a central processing unit ("CPU") 502, in the form of one or more processors, for executing program instructions. The platform may include an internal communication bus 508, and a storage unit 506 (such as ROM, HDD, SDD, etc.) that may store data on a computer readable medium 522, although the system 500 may receive programming and data via network communications including via network 125. The system 500 may also have a memory 504 (such as RAM) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to loading an operating system in response to a malfunction or for a system update, it should be appreciated that the presently disclosed embodiments may be applicable to loading an operating system for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 3 and 4 and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. An automated teller machine (ATM), comprising:
   a user interface configured to receive interaction requests by a user;
   a first data storage medium storing a first operating system, wherein the first data storage medium is encrypted such that decryption is required to access the first operating system;
   a second data storage medium storing a second operating system;
   a memory storing instructions; and
   a control unit including a processor, wherein the control unit is operatively connected to the memory and configured to execute the instructions to carry out a plurality of operations, including:
  booting the ATM to the first operating system in response to the ATM being powered on;
  receiving an operating system image containing an updated operating system;
  overwriting the second operating system on the second data storage medium with the updated operating system;
  booting the ATM to the updated operating system in response to the overwriting;
  determining an error status of the updated operating system, the error status being indicative of an error in the updated operating system;
  transmitting a notification of the error status of the updated operating system to a remote server via a secure communications channel;
  receiving a boot instruction from the remote server via the secure communications channel, wherein the boot instruction is transmitted in response to the notification of the error status; and
  in response to the boot instruction, automatically decrypting the first data storage medium and booting the ATM to the first operating system instead of the updated operating system.

2. The ATM of claim 1, wherein:
the first data storage medium is a first hard disk drive; and
the second data storage medium is a second hard disk drive distinct from the first hard disk drive.

3. The ATM of claim 1, wherein:
the first data storage medium is a first partition of a hard disk drive; and
the second data storage medium is a second partition of the hard disk drive.

4. The ATM of claim 1, wherein:
the first operating system and the second operating system are encrypted; and
the plurality of operations further include:
  prior to booting to the first operating system, decrypting the first operating system; and
  prior to booting to the updated operating system, decrypting the updated operating system.

5. The ATM of claim 4, wherein the control unit further includes a secure cryptoprocessor, the secure cryptoprocessor being configured to:
perform the decrypting of the first operating system;
perform the decrypting of the updated operating system;
transmit a first verification of the first operating system to the remote server via the secure communications channel; and
transmit a second verification of the updated operating system to the remote server via the secure communications channel.

6. The ATM of claim 4, wherein the control unit further includes a secondary processor, the secondary processor being configured to:
perform the receiving of the boot instruction; and
perform the booting to the updated operating system.

7. The ATM of claim 6, wherein the secondary processor is further configured to:
perform the receiving of the boot instruction from the remote server via the secure communications channel.

8. The ATM of claim 7, wherein the plurality of operations further include:
transmitting an alert to the remote server via the secure communications channel that is indicative of a malfunction of the updated operating system.

9. The ATM of claim 1, wherein the first operating system is a modified version of the second operating system.

10. The ATM of claim 1, wherein the plurality of operations further include:
after booting to the first operating system instead of the updated operating system, receiving a second boot instruction from the remote server via the secure communications channel; and
in response to the second boot instruction, booting to the updated operating system.

11. The ATM of claim 1, wherein the plurality of operations further include:
after booting to the first operating system instead of the updated operating system, receiving a third operating system from the remote server via the secure communications channel; and
overwriting the updated operating system and storing the third operating system on the second data storage medium.

12. A computer-implemented method for managing an ATM, the method comprising:
booting, by the ATM, to a first operating system stored on a first data storage medium;
receiving, by the ATM, an operating system image containing an updated operating system;
overwriting, by the ATM, a second operating system on a second data storage medium with the updated operating system;
booting, by the ATM, to the updated operating system in response to the overwriting;
determining, by the ATM, an error status of the updated operating system, the error status being indicative of an error in the updated operating system;
transmitting a notification of the error status of the updated operating system to a remote server via a secure communications channel;
receiving, by the ATM, a boot instruction from the remote server via the secure communications channel, wherein the boot instruction is transmitted in response to the notification of the error status; and
in response to the boot instruction, automatically decrypting the first data storage medium and booting, by the ATM, to the first operating system instead of the updated operating system, wherein decryption is required to access the first operating system.

13. The method of claim 12, further comprising:
prior to booting to the first operating system, decrypting the first operating system; and
prior to booting to the updated operating system, decrypting the updated operating system.

14. The method of claim 13, wherein the ATM includes a processor and a secure cryptoprocessor; and
the secure cryptoprocessor is configured to:
  perform the decrypting of the first operating system; and
  perform the decrypting of the updated operating system.

15. The method of claim 12, wherein the ATM includes a primary processor and a secondary processor;
the primary processor is configured to:
  perform the booting to of the first operating system;
  perform the booting to the updated operating system; and
the secondary processor is configured to:
  perform the receiving the boot instruction from the remote server.

16. The method of claim 12, wherein:
the first data storage medium is a first hard disk drive; and
the second data storage medium is a second hard disk drive distinct from the first hard disk drive.

17. The method of claim 12, further comprising:
after booting to the first operating system instead of the updated operating system, receiving, by the ATM, a second boot instruction from the remote server via the secure communications channel; and
in response to the second boot instruction, booting, by the ATM, to the updated operating system.

18. The method of claim 12, further comprising:
after booting to the first operating system instead of the updated operating system, determining, by the ATM, a second status of the first operating system;
transmitting the second status to the remote server via the secure communications channel;
receiving, by the ATM, a second boot instruction based on the second status from the remote server via the secure communications channel; and
in response to the second boot instruction, booting, by the ATM, to the updated operating system.

19. The method of claim 18, wherein the second operating system is a modified version of the first operating system.

20. A system comprising:
a remote server configured to communicate via a secure network; and
an ATM configured to communicate via the secure network, the ATM including:
  a user interface configured to receive interaction requests by a user;
  a first hard disk drive storing a first operating system, wherein the first hard disk is encrypted such that decryption is required to access the first operating system;
  a second hard disk drive storing a second operating system;
  a memory storing instructions; and
  a control unit including a primary processor and a secondary processor wherein the control unit is operatively connected to the memory and configured to execute the instructions to:
    boot the ATM to the first operating system in response to the ATM being powered on;
    communicate with a remote server via a secure communications channel;
    in response to an interaction request received via the user interface, perform an interaction, wherein performing the interaction involves exchanging interaction data with the remote server via the secure communications channel;
    receive an operating system image containing an updated operating system;
    overwrite the second operating system on the second hard disk with the updated operating system;
    boot the ATM to the updated operating system in response to the overwriting;
    transmit a status of the updated operating system to the remote server via the secure communications channel;
    receive a boot instruction from the remote server via the secure communications channel; and
    in response to the boot instruction, automatically decrypting the first hard disk and cause the ATM to boot to the first operating system instead of the updated operating system.

\* \* \* \* \*